United States Patent [19]

Dew

[11] Patent Number: 4,996,096

[45] Date of Patent: Feb. 26, 1991

[54] COEXTRUDED MATTE FILM

[75] Inventor: Jimmy S. Dew, Union City, Calif.

[73] Assignee: James River II, Inc., Oakland, Calif.

[21] Appl. No.: 259,547

[22] Filed: Oct. 17, 1988

[51] Int. Cl.$^5$ .............................................. B32B 27/08
[52] U.S. Cl. .................................... 428/216; 428/349; 428/516; 264/176.1
[58] Field of Search ....................... 428/216, 516, 349; 525/240

[56]     References Cited
U.S. PATENT DOCUMENTS 4,560,598  12/1985  Cowan ................................. 428/35.2

Primary Examiner—P. C. Sluby
Attorney, Agent, or Firm—Stanley M. Teigland

[57]     ABSTRACT

A coextruded film having a matte surface layer is prepared by forming the layer from a blend of polyisobutylene and high density polyethylene. The film preferably has a heatseal layer on the other surface. In addition to having low gloss for consumer appeal, the matte surface layer has a medium coefficient of friction for good machinability and excellent heat resistance to facilitate heatsealing. The film is especially useful as an overwrap for packaging consumer products.

7 Claims, No Drawings

COEXTRUDED MATTE FILM

This invention is a coextruded plastic film having a nonembossed matte surface layer.

As disclosed in U.S. Pat. No. 3,843,478, coextruded films having a nonembossed matte surface layer are known in the art. However, such surface layers tend to have a high coefficient of friction, which limits their suitability for use in automatic packaging equipment. This invention provides a film having a matte surface layer having a coefficient of friction which renders the film especially suitable for processing in packaging equipment. The matte surface layer also imparts other desirable properties to the film.

The film of this invention comprises a matte surface layer consisting essentially of a blend of from about ten to forty percent polyisobutylene, fifty to ninety percent high density polyethylene, and zero to forty percent propylene homopolymer. The term high density polyethylene refers to polyethylene having a density greater than about 0.94.

The polyisobutylene has a molecular weight of at least 50,000 as measured in accordance with ASTM D2503-82. The use of polyisobutylene having a much lower molecular weight to increase the coefficient of friction of the surface layer of a plastic bag is disclosed in U.S. Pat. No. 4,560,598, but the increased coefficient of friction, being at least 0.8, is greater than the coefficient of friction that is desirable for purposes of this invention. The film of this invention has a coefficient of friction of between about 0.2 and 0.7, preferably between about 0.3 and 0.5, as measured in accordance with ASTM D1894.

The matte surface layer has a gloss of less than ten percent, preferably less than eight percent, as measured in accordance with ASTM D1223.

The other layer or layers of the coextruded film are not critical as long as they provide other desired properties. The other surface layer of the film is preferably a heat seal layer, such as a layer of ethylene-vinyl acetate copolymer or ethylene-methyl acylate copolymer. The film preferably includes a core layer providing strength and bulk, such as a polyolefin layer. Suitable polyolefins include low density polyethylene, linear low or medium density polyethylene, and blends thereof. The core layer also preferably contains a pigment.

The thickness of the film of this invention is preferably between about 1.0 and 3.0 mils, with the thickness of the matte surface layer preferably being between about 0.1 and 0.3 mil.

The best mode contemplated for practicing the invention is illustrated by the following example, in which all percentages are by weight.

EXAMPLE

A film having a matte surface layer, a core layer, and a heat seal layer was prepared by coextrusion. The ratio of the thicknesses of the layers was 10:83:7. The matte surface layer consisted of a blend of 75 percent high density polyethylene having a melt index of 12 and 25 percent polyisobutylene having a Mooney viscosity of 80, which corresponds to a molecular weight between about 64,000 and 81,000. The core layer consisted of a blend of 50.5 percent low density polyethylene, 33.5 percent linear medium density polyethylene, and 16 percent of a color concentrate. The color concentrate consisted of 50 percent red and white pigments in low density polyethylene. The heat seal layer consisted of ethylene-vinyl acetate copolymer having a vinyl acetate content of 23 percent. Physical properties of the film were determined and compared with a film prepared under the same conditions except a layer consisting of a blend of 75 percent high density polyethylene and 25 percent linear medium density polyethylene was substituted for the matte surface layer. The results are reported in the following table.

TABLE

| Property | Matte Surface Film | Comparative Film |
| --- | --- | --- |
| Basis Weight, lbs/ream | 23.2 | 22.8 |
| Thickness, mils | 1.57 | 1.53 |
| Gloss, percent | 6.5 | 46 |
| Surface Energy after Corona Treatment, dynes | 41 | 38 |
| Coefficient of Friction | | |
| Blend/Blend | 0.37 | 0.15 |
| Heatseal/Heatseal | 0.42 | 0.20 |
| Secant Modulus, Mpsi | | |
| MD | 28 | 38 |
| CD | 32 | 42 |
| Puncture Resistance | | |
| Force, kg | 5.3 | 2.2 |
| Energy, kg/in | 3.6 | 1.1 |
| Elmendorf Tear, grams | | |
| MD | 265 | 80 |
| CD | 720 | 690 |

The film of the invention illustrated by this example is especially suitable as an overwrap for packaging consumer products in an automatic packaging machine wherein the film is formed and heatsealed to itself. The film has low gloss and low stiffness, giving a cloth-like appearance for consumer appeal. The film has a medium coefficient of friction on both surfaces, which is especially desirable for good machinability. The film has a high surface energy for good printability, good tear strength, and good puncture resistance. The matte surface layer has excellent heat resistance, which facilitates heat sealing of the film. The film may be heat sealed at a temperature of 260° F. without having the heatseal jaws stick to the matte surface layer.

I claim:

1. In a coextruded film having a nonembossed matte surface layer having a gloss of less than ten percent, the improvement wherein the matte surface layer consists essentially of a blend of from about ten to forty percent polyisobutylene, fifty to ninety percent high density polyethylene, and zero to forty percent propylene homopolymer, the polyisobutylene having a molecular weight of at least 50,000, and the matte surface layer has a coefficient of friction with itself of between about 0.2 and 0.7.

2. The film of claim 1 wherein the coefficient of friction is between about 0.3 and 0.5.

3. The film of claim 1 wherein the matte surface layer has excellent heat resistance, whereby the heatseal layer may be heatsealed to itself using heatseal jaws having a temperature of 260°0 F. without having the jaws stick to the matte surface layer.

4. The film of claim 3 having a thickness of from about 1.0 and 3.0 mils.

5. The film of claim 4 wherein the thickness of the matte surface layer is between about 0.1 and 0.3 mil.

6. The film of claim 2 having a further layer forming the other surface of the film, the further layer being a heatseal layer.

7. The film of claim 5 having a still further layer forming a core layer, the still further layer being a layer of a polyolefin.

* * * * *